June 24, 1952     A. R. WELCH     2,601,349
METHOD OF AND APPARATUS FOR MAKING COVERED WOOD PRODUCTS
Filed Aug. 9, 1944     4 Sheets-Sheet 1
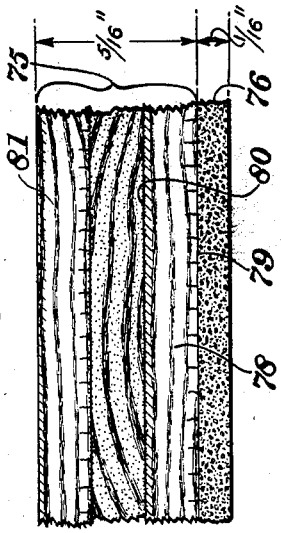
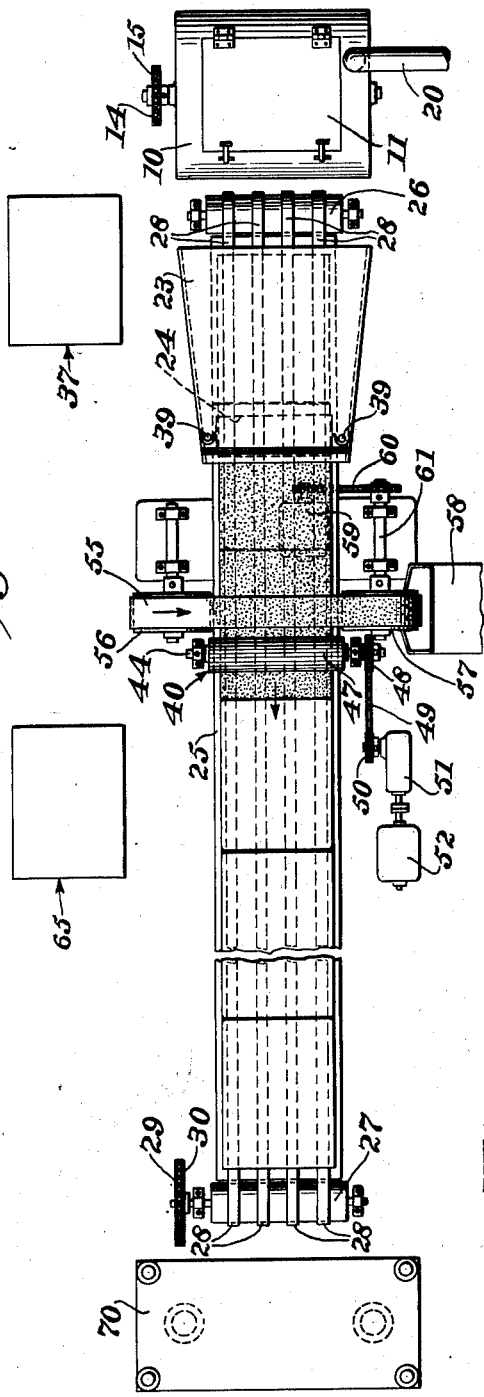
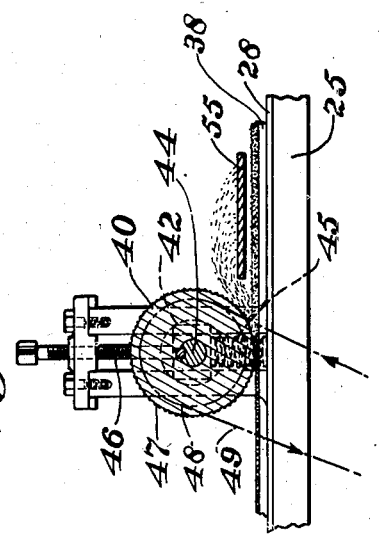
Inventor:
Arthur R. Welch,
By Cushman Darby Cushman
Attorneys.

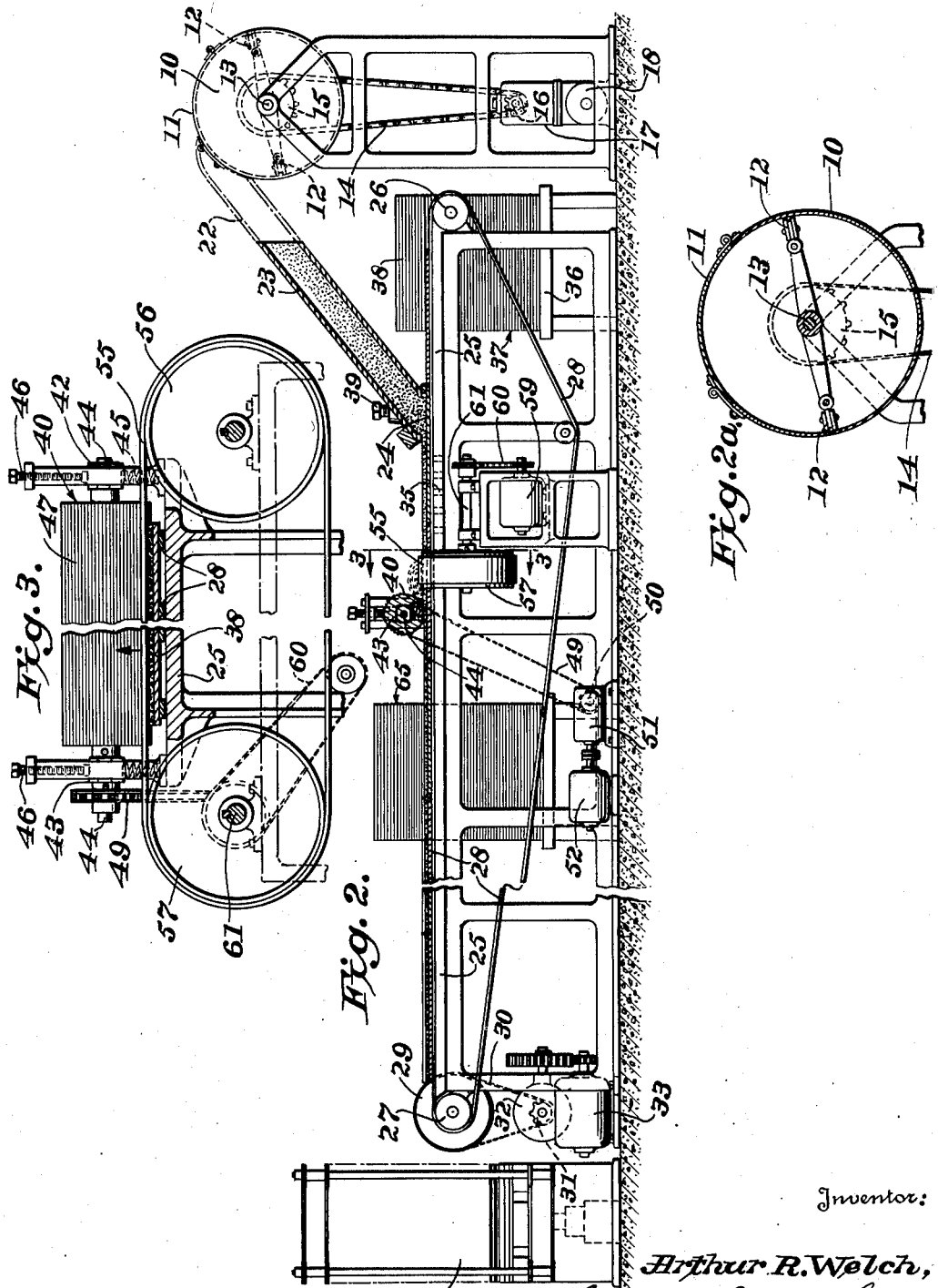

June 24, 1952  A. R. WELCH  2,601,349
METHOD OF AND APPARATUS FOR MAKING COVERED WOOD PRODUCTS
Filed Aug. 9, 1944  4 Sheets-Sheet 3
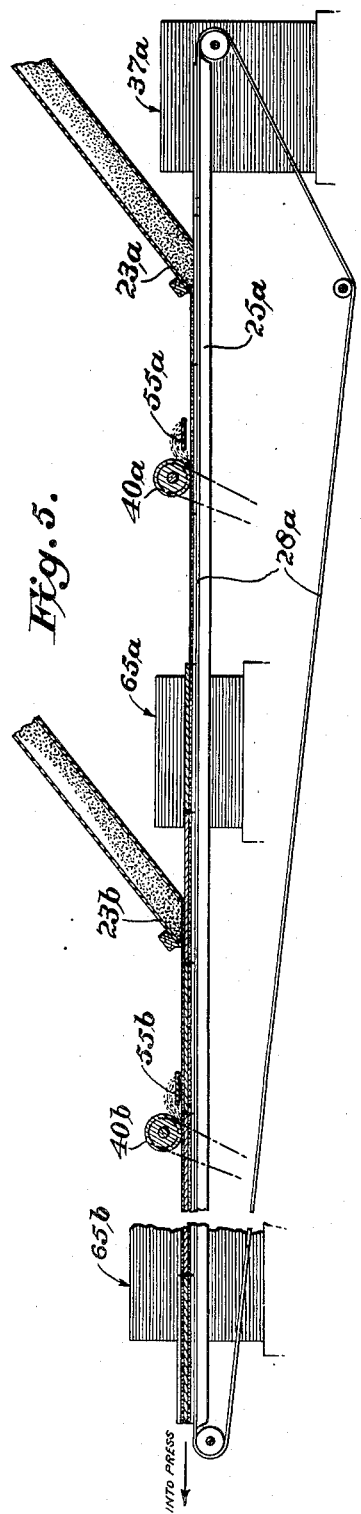
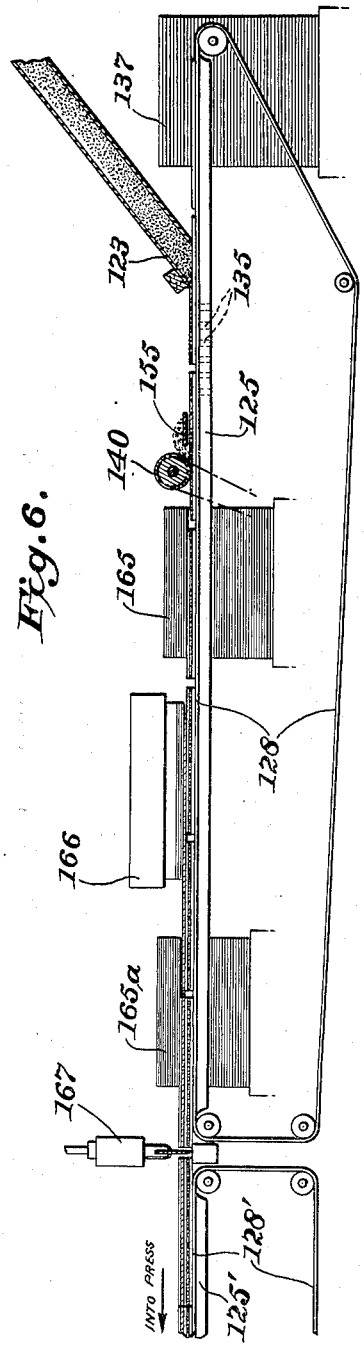
Inventor.
Arthur R. Welch,
By Cushman Darby Cushman
Attorney June 24, 1952  A. R. WELCH  2,601,349
METHOD OF AND APPARATUS FOR MAKING COVERED WOOD PRODUCTS
Filed Aug. 9, 1944  4 Sheets-Sheet 4
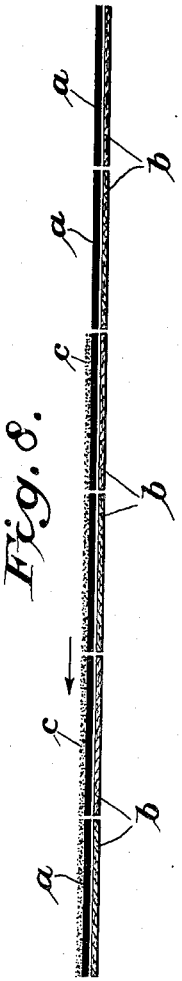
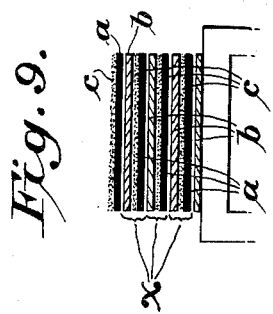
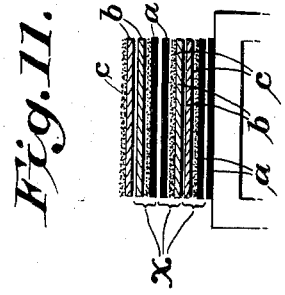
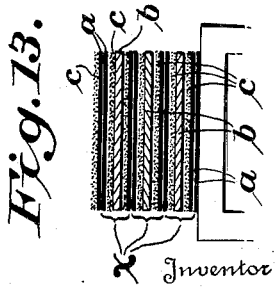
Inventor
Arthur R. Welch,
By Cushman Darby & Cushman
Attorneys Patented June 24, 1952

2,601,349

UNITED STATES PATENT OFFICE 2,601,349

METHOD OF AND APPARATUS FOR MAKING COVERED WOOD PRODUCTS

Arthur R. Welch, Hoquiam, Wash.

Application August 9, 1944, Serial No. 548,774

15 Claims. (Cl. 154—132)

The present invention relates to methods of and apparatus for making a new type of wood product, having many improved structural and functional characteristics. The product made by the new methods and apparatus is the subject of a separate application, filed concurrently herewith. Broadly, it comprises a wood slab or sheet, such as wood plies adhesively secured together, preferably by a waterproof or water-resistant adhesive, and a layer on one or both faces of an aggregate of synthetic resin or equivalent binder and wood particles, such as sawdust, sanderdust or the like, mixed in suitable proportions, depending upon the characteristics desired in the finished product, and consolidated with the wood plies under heat and pressure.

The primary object of the invention of the present application is to provide simple, effective and improved methods of and apparatus for producing such a product, economically and at high production rates.

A further object of the invention is to provide a novel and improved sequence of steps in assembling the plywood panels or the component parts thereof, with layers of the aggregate, for subsequent consolidation in a hot press. To this end, the invention provides improved means for and methods of distributing a layer of uniform thickness of a mixture of synthetic resin and wood particles in relatively dry, loose, non-compacted condition, for union with plywood panels or non-consolidated veneer plies.

A further object of the invention is to provide a method of making plywood panels which makes it possible to eliminate certain costly and troublesome practices, currently found to be necessary in the commercial plywood art. Because of the difficulties at the present time of securing large veneer face plies of unblemished wood, free from knot holes, rosin pockets, checks and the like, face plies are necessarily patched to eliminate the defects and edge-glued, to build up the required ply width, before being assembled with core plies to produce plywood panels. The patching operation in a large plywood mill is an expensive and time-consuming operation, requiring the full-time services of numerous employees. The patches themselves must be cut from the best veneer available, and the operation of cutting out the defects in the face plies is laborious and requires the services of several men on each shift in an average size plant. Other employees devote their entire time to inserting the patches in the cut-out portions and in setting the adhesive which holds the patches in place.

Another object of the invention is to eliminate, in the manufacture of plywood, the necessity of patching the face plies and of edge gluing a plurality of strips or sheets to make face plies, prior to the assembly thereof with core plies.

A further important object of the invention is to increase very materially the square footage of plywood of improved or standard grade and thickness which may be produced from a given supply of logs.

Another object of the invention is to provide a method of utilizing the tremendous waste of wood which currently is produced in all plywood mills, and to employ this waste material to increase the production from a given supply of logs.

A further object of the invention is to eliminate the sanding operation and its waste of wood, currently universally encountered in plywood mills.

In accordance with the present invention, veneer plies of less thickness than standard may be peeled from the log, thereby correspondingly increasing the production of veneer from the log. The plies may be assembled to produce a plywood panel of less thickness, prior to sanding than a corresponding grade of standard plywood panel, after sanding. A layer of an aggregate of synthetic resin and wood particles may be added to the non-sanded panel, to bring it up to standard thickness when subjected to heat and pressure in the hot press. It is conventional practice in the plywood industry to make panels of extra thickness, so that a substantial amount, such as $\frac{1}{16}$ or $\frac{1}{8}$ of an inch may be removed from one or both faces, during the finish sanding operation. Of course, the wood removed by the sander is wasted. In accordance with the present invention, this waste is eliminated, because sanding is rendered unnecessary, and the production from the log is further increased by initially making the veneer plies and the plywood panel undersize instead of oversize. As stated above the product is brought up to standard thickness by adding a layer of the aggregate to one or both faces of the panel, under heat and pressure.

A further object of the invention is to provide a method of producing a coated plywood panel which will not warp when removed from the hot press or when subsequently subjected to changes in moisture content. The aggregate applied as a surface layer or covering sets up no stresses in the wood when removed from the press and apparently expands and contracts with the wood, upon changes in moisture content, since panels covered on one surface only show no tendency to warp, as is the case with panels coated on one surface only with resin impregnated paper.

Attempts have been made in the past to overcome the defects resulting from the poorer and poorer quality veneer plies available on the market, by coating the plywood panels with resin impregnated paper, but the practice has been very expensive and quite unsatisfactory. The panels warp badly when the paper is applied to one surface only, with the result that manufacturers have resorted to the unnecessary and expensive practice of coating both surfaces of the panels with paper, even though only one surface is exposed. Moreover, the paper does not fill or make contact with the low spots on the veneer face plies and only adheres to the high spots, unless extremely high pressures are used when securing the paper to the panel. In such case, after the high pressure is relieved, the grain swells and leaves raised areas which are clearly visible through the paper and which detract from the appearance of the product. All of these disadvantages are avoided by the method of the present invention, and the defects are absent in the resulting product.

Moreover, I have discovered an improved method of assembling plywood panels, for the reception of paper or other coatings or coverings, to eliminate the above mentioned grain swelling phenomenon. It is the universal practice in the plywood industry to assemble the face plies with the "front" face of the veneer exposed and with the "back" face inside, in contact with the glue-coated core plies. The "front" face of a veneer sheet is the face which, prior to peeling the veneer from the log, was nearer the bark, and the "back" face is the surface which was formerly nearer the heart. When veneer is peeled from the log, it is, of course, straightened out with the result that the wood fibers on the convex outside or front face are compressed and compacted, and the fibers on the concave, inside or back face are substantially pulled apart, so that a great plurality of minute cracks or fissures are formed on the back surface between groups or bundles of fibers. Because of the compacted structure on the front face, the grain tends to swell outwardly on that face, upon an increase in moisture content or upon the release of high bonding pressure. On the other face, however, the grain may expand laterally and fill up the minute fissures, with the result that the grain on this face does not rise appreciably.

I have discovered that an improved plywood panel for the reception of coating material generally, including paper, paint and the aggregate of the present invention, may be produced by assembling the face plies with the back face out and the front face in. The minute fissures not only provide spaces for the expansion of the wood, thereby preventing grain raising, but provide interstices for the reception of paint, adhesives or the like, thereby producing an improved and firmer bond between the coating material and the wood ply. As far as I am aware, this is a novel procedure in the plywood art and results in unknown and unforseeable advantages.

The method of the present invention and the resulting coated plywood product are extremely flexible, as far as the characteristics of the product are concerned. That is to say, by varying the composition of the aggregate and by varying the heat and pressure applied during the compacting of the aggregate and its bonding to the panel, the characteristics of the coating, as to porosity, density, moisture and water-proofness and acoustical properties may be varied widely. For instance, the proportions of sawdust to synthetic resin may be varied from 50 to 1, or thereabout, to 1 to 1, depending upon the characteristics desired in the finished product. Preferably the material is consolidated under high pressure, just below the crushing limit of the wood, but lower bonding pressures may be employed in certain cases, if a less dense layer is desired.

In one method according to the present invention, a plurality of metal plates with their ends contiguous, but spaced slightly apart, are conveyed in a line below a distributing station, where a layer of aggregate is applied to their upper surfaces, as previously described. Immediately thereafter, a plurality of face plies are laid upon the layer of aggregate, with their margins substantially registering with the margins of the metal plates and with their ends contiguous. These face plies need not necessarily be of the full width of the metal plates, but may consist of a plurality of strips with the grain running longitudinally of the line and with their side edges in abutment, thereby avoiding the necessity of edge-gluing or edge-taping, mentioned above.

At the next station in the line, cross-banding stock (core plies) having their upper and lower surfaces glue-coated may be laid upon the face plies with the grain running transversely of the line and with their side edges in abutment, the core plies being substantially equal in length to the width of the face plies and the metal sheets, and being arranged to overlap, by a substantial amount, the ends of the core plies and spanning the spaces therebetween.

At the next station in the line, the core plies may be clipped on lines between the ends of the face plies and the ends of the metal plates, or this clipping operation may be performed after the next series of face plies are applied. These plies are laid upon the upper surfaces of the core plies, with the grain running longitudinally of the line and with their margins in substantial registry with the margins of the first series of face plies and the metal plates. The uppermost face plies may be edge-glued or taped, so as to be equal in width to the finished panel, or they may be made up of a plurality of strips laid upon the core plies in edge abutting relation. The latter procedure is entirely feasible, if a second layer of aggregate is applied to the upper surfaces of the face plies, but, otherwise, a full-width ply is preferred. As suggested above, it is immaterial whether the core plies are severed along the lines of substantial end abutment of the first series of face plies and metal plates, before or after the upper series of face plies are laid on.

The assemblies so produced are loaded into the hot press and subjected to heat and pressure, to consolidate the several veneer plies into a plywood panel and to bond the covering of aggregate to one or both surfaces thereof, as the case may be.

In the accompanying drawings a number of production lines are illustrated diagrammatically, to indicate the type of apparatus which may be used in accordance with the present invention, to carry out the various methods. These drawings are quite diagrammatic in character and are not intended to illustrate all of the details of construction of the various elements which may be employed, or to limit the scope of the invention to the details shown.

Figure 1 is a plan view of one combination of instrumentalities.

Figure 2 is a side elevation thereof.

Figure 2a is a transverse section of an aggregate mixer.

Figure 3 is a transverse section taken substantially on line 3—3 of Figure 2.

Figure 4 is a cross-sectional view of the elements shown in Figure 3, showing the smoothing and distributing apparatus.

Figure 5 is a diagrammatic longitudinal sectional view of a modified apparatus and method.

Figure 6 is a similar view of still another modification.

Figure 7 is an enlarged fragmentary sectional view of one form of product, and

Figures 8–13, are diagrammatic representations of three preferred assembling methods.

As shown in Figures 1 and 2 a mixer 10 having a relatively tight cover 11 and mixing blades or arms 12, mounted for rotation on a central shaft 13 is positioned at the rear end of the line. The mixer may be driven by a chain 14, connected to a sprocket 15, fast on the shaft 13, and trained about a sprocket 16 associated with a speed reducer 17, driven by an electric motor 18. A conduit 20 communicates with the interior of the mixer at one of its ends and is connected to a source of vacuum, such as a centrifugal suction fan or the like at its other end, so as to subject the material in the mixer to a partial vacuum, in order to reduce the moisture content thereof to the desired degree. Heating means, such as steam pipes, electric resistance elements or the like may be associated with the mixer, to assist in the removal of moisture from the wood particles deposited therein.

A hopper 22 is arranged to receive the mixed materials from the mixer, for instance, by opening the cover 11 and shifting the angular position of the peripheral opening of the mixer 10 so as to register with the upper end of the hopper. As the arms 12 rotate, the material will be discharged into the hopper 22. Of course, the mixer need not be directly associated with the hopper, as it is often advisable to keep on hand large supplies of aggregate in storage bins or the like, from which the aggregate may be transferred to the hopper by manual means or by conventional conveyors.

At its lower end, the hopper 22 communicates with the upper end of a chute 23, arranged at such an angle that the material will move therethrough under the influence of gravity, toward the open lower end 24 thereof.

Below the chute 23, there is positioned an elongated table 25, having a roll 26 at its rear end and another roll 27 journalled at its forward, discharge end. A conveyor 28, which may conveniently consist of four or more parallel belts, is trained about the rolls 26, 27 and about an idler roll below the table. In the preferred embodiment, the conveyor is driven by a sprocket 29, fast on the shaft which carries the roll 27, and about which is trained a chain 30, driven by a sprocket 31 associated with a speed reducer 32, driven by a motor 33.

The table 25 may be provided with a foraminous section 35, or with transversely extending slots or openings so that any excess material, not received by plates or panels, as hereinafter described, may fall by gravity from the table and be collected for re-use. Otherwise the aggregate might accumulate on the table or be pushed to the discharge end thereof.

Adjacent the head of the conveyor is a platform or table 36 adapted to support a stack 37 of metal plates or plywood panels 38, according to the procedure being followed.

The plates or panels are laid upon the conveyor in succession, with their ends contiguous thereby forming a substantially continuous unbroken line. They pass below the chute 23, where they receive a roughly approximated layer of aggregate of excess thickness from the open end 24 thereof. The material is relatively dry, light and loose or fluffy and is laid on the plates or panels by gravity, with a somewhat rough or irregular upper surface. The thickness of the initial layer is determined by the distance of the open end 24 of the chute from the surface of the panels or plates. The lower end of the chute is mounted for vertical adjustment by any appropriate means, such as screws 39, so that thickness of the layer can be changed at will.

As the plates with the layer of aggregate thereon move forwardly, they pass beneath a smoothing roller 40, mounted for rotation above the conveyor in vertically adjustable bearing blocks 42, 43, in which the roll shaft 44 is journalled. The vertical adjustment may be effected in any desired manner, as by means of upwardly acting springs 45 and hold-down screws 46. The surface of the smoothing roll is preferably provided with a plurality of parallel longitudinally extending grooves 47 or any other desired configuration, to provide a roughened surface. The roll is rotated at a relatively high speed, reversely with respect to the forward direction of movement to the plates or panels, by means of a sprocket 48, fast on the roll shaft, about which is trained a chain 49, connected to the sprocket 50 of a speed reducer 51, driven by electric motor 52.

A belt 55, trained about pulleys 56, 57, has its upper run disposed above the metal plates and the aggregate thereon, immediately behind the roll 40, positioned to receive the excess material thrown rearwardly by the roll, as illustrated diagrammatically in Figure 4. The belt catches the excess material, before it falls upon the oncoming aggregate and conveys it to one side, where it is collected by an appropriate hopper 58, for re-use at the rear end of the line. It is important that the accumulation of a substantial mass of aggregate, behind the roll 40 be avoided, in order to prevent compacting of the material on the plates or panels. The arrangement disclosed effectively removes the excess material, thrown rearwardly by the smoothing and distributing roll. Of course, equivalent removing means may be substituted for the cross-conveyor 55. The cross-conveyor 55 may be driven by a motor 59, connected by a chain 60 to the shaft 61 which supports the pulley 57.

The plates or panels leave the distributing roll 40 with an accurately controlled, smooth layer of aggregate on their upper surfaces, of uniform thickness. This layer is laterally unconfined and is of quite substantial thickness, but, as indicated in Figure 4, is of less thickness than the plywood panel 38. A second stack 65 of panels or metal plates may be positioned ahead of the distributing roll station, so that panels or plates may be laid, individually, upon the upper surface of the layer, with their margins in registry with the previously deposited plates or panels. That is to say, if metal plates were laid upon the conveyor at the first station, previously consolidated plywood panels may be laid upon the aggregate from the stack 65, whereas if plywood panels were first laid upon the conveyor, metal plates from the stack 65 will be placed on top of the aggregate. In either event, one metal plate should have its margins in substantial registry with one plywood panel, when the assemblies reach the discharge end of the table 25. As pointed out below, however, the stack 65 may be eliminated and the plates and panels both applied at the head of the line, according to several different plans.

The assemblies so produced are transferred from the foot of the line to a hot press 70. As is well understood in the art, the assemblies may first be stacked, by an automatic stacker or manually, and then be transferred to and accumulated in a press loader, for transfer in groups or as individual assemblies to the hot press, for treatment under heat and pressure. During the pressing operation the loader is again accumulating another group of assemblies. The stacker and the press loader are not shown in the accompanying drawings, since their structure and use are well understood in the plywood art.

After pressing, the assemblies are removed from the press, for instance, by being pushed out by the next incoming press load, transferred to the press by the loader. When the assemblies have cooled sufficiently to be handled, the metal plates are stripped therefrom, whereupon the plates may be re-used, after cleaning if necessary, and after having had their surfaces treated with oil, talc or any other suitable material to prevent the sticking of synthetic resin thereto.

If it is desired to produce panels, having both surfaces covered with the synthetic resin, wood particle aggregate, the procedure illustrated diagrammatically in Figure 5 may be employed. Metal plates from a stack 37a are laid in a line upon the conveyor 28a, with their ends contiguous, and a layer of aggregate is deposited thereon, from the chute 23a. A smoothing roller 40a removes the excess material by throwing it upon a cross-conveyor 55a, as previously described, leaving a smooth, continuous layer of aggregate of accurately controlled thickness on the plates. Plywood panels from the stack 65a are laid upon this layer, with their margins in registry with the margins of the metal plates and with their ends contiguous.

The panels and plates next pass under a second chute 23b, where a layer of aggregate of excess thickness is applied to the panels. Next, they pass under a second distributing roller 40b, which again removes the excess aggregate, through the system of a cross-conveyor belt 55b, as previously explained, leaving on the upper surface of the line of plywood panels, a smooth, uniform layer of aggregate of accurately controlled thickness.

Metal plates from a stack 65b are successively laid upon the oncoming assemblies, with their margins in registry with the lower plates and the intermediate plywood panels. The assemblies so produced may be stacked and then loaded into a hot press, as previously described, and subjected to heat and pressure, to bond the layers of aggregate to the plywood panels, and the metal plates stripped therefrom after the pressing operation.

By following a somewhat different procedure, the apparatus shown in Figures 1 and 2 may be employed to produce either single or double coated plywood panels; that is, having a layer of aggregate bonded to one face, or layers bonded to both faces. The procedures now to be described are in many cases preferred, since they make it possible to eliminate an extra plate or panel handling operation and dispense with the employees who deposit the plates or panels from the stack 65 onto the line. Moreover, the second aggregate distributing station and apparatus shown in Figure 5 may be eliminated.

If panels having one side only covered with aggregate are to be produced, the stack 37 may consist of individual metal plates and plywood panels in alternation with each other, or there may be two stacks at this station, one of panels and the other of plates. Referring to Figure 8, the operators at the station at the right hand end of the line lay onto the conveyor pairs of panels and plates, each pair consisting of a metal plate a and a plywood panel b with their margins in registry and with the ends of successive pairs in substantial abutment. It is substantially immaterial whether the metal plates or the plywood panels are uppermost, so long as the arrangement is uniform. The pairs move along the conveyor, as previously described, and receive a layer of aggregate c on their upper surfaces. At the left-hand end of the line, the successive assemblies are stacked, as indicated in Fig. 9, whereupon the bottom member of each assembly (except the lowermost in the stack), becomes the top member of an assembly therebelow. The bottom members of the successive assemblies will be superposed upon the aggregate on the upper surfaces of the preceding assemblies. For instance, referring to Figures 8 and 9, if the metal plate a in each pair is uppermost, the bottom plywood panel b of the next pair will be joined to the layer of aggregate c on the preceding metal plate a. If the plywood panel is uppermost in each pair, the metal plate of the following pair will be positioned upon the aggregate on the preceding panel and will serve to consolidate the aggregate to the panel of the first pair.

After a stack of assemblies of suitable height has been built up, the stack is subdivided into smaller units x, either groups or individual assemblies, by separating the stack on lines of face-to-face contact between the plates and panels so that each assembly consists of a panel and a plate, with a layer of aggregate interposed. The assemblies are loaded into the hot press, either individually or in groups, depending upon their thickness and the size of the openings in the loader and in the hot press, between the platens thereof.

Still another procedure may be adopted to produce single coated panels, as indicated in Figures 10 and 11. The operators may lay on the conveyor, pairs of superposed metal plates a and pairs of superposed plywood panels b, alternately, with their margins registered and their ends contiguous. When these assemblies are stacked, after a layer of aggregate c has been applied to their upper surfaces, it will be found (Figure 11) that the stack will contain a pair of metal plates a, a layer of aggregate c, a pair of panels b, a layer of aggregate c, a pair of plates a, and so on. The lower panel of each pair will have a layer of aggregate therebelow and the upper panel a layer of aggregate thereabove. After the assemblies have been stacked, the stack is subdivided into smaller units x, as mentioned above, by separating the assemblies on lines between the pairs of metal plates and/or the pairs of panels, instead of on the lines of contact between a metal plate and plywood panel, as in the procedure mentioned immediately above.

In most cases the first stacking procedure, where each pair consists of a metal plate and a plywood panel is preferred, since each pair will be of the same total thickness, whereas in some cases a pair of plywood panels might be of greater or less thickness than a pair of metal plates, and the thickness of the successive aggregate coatings might be different.

If it is desired to produce plywood panels with aggregate coatings on both faces, without employing a pair of aggregate depositing and smoothing instrumentalities, as shown in Figure 5, the following procedure may be adopted, using the apparatus shown in Figures 1 and 2. Referring to Figures 12 and 13, metal plates $a$, substantially one-half the thickness of the plywood panels $b$, may be employed. From a previously prepared stack or from separate stacks of metal plates and plywood panels, the panels and plates are laid upon the conveyor in a sequence consisting of a pair of plates $a$, a single panel $b$, another pair of plates $a$, another panel $b$, and so on, with the margins of the plates in registry and with their ends in substantial abutment with the alternate panels. After this sequence of panels and plates has been covered with a layer $c$ of aggregate, they may be stacked, as shown in Figure 13. The stack will consist of a pair of metal plates $a$, a layer of aggregate $c$ thereabove, an intermediate plywood panel $b$, an upper layer of aggregate $c$, another pair of plates $a$, and so on. The stack may be separated on lines between the adjacent metal plates to form assemblies $x$, or groups of assemblies, and loaded into a press, as previously described. After pressing, the metal plates may be stripped from the aggregate layers and the plywood panels having both surfaces coated will be produced.

In the various stacks described above, the lowermost plate or panel of the bottom pair is not actually used in that position, but may be set aside, after the stack has been loaded into the loader or the press, and used as a top plate or panel for the next stack, since the upper surface of the uppermost pair in the stack will be covered with a layer of agregate. It is apparent that this layer must be covered with a plate or panel before it is loaded into the press, to prevent the aggregate from sticking to the press platen.

These procedures are preferred in many cases, since by simply changing the arrangement of panels and plates on the conveyor, the same apparatus may be employed to produce a plurality of different types of products, and an extra plate or panel handling station is eliminated.

The plywood panels may be of any desired thickness and may have any number of plies. Preferably, the panels are non-sanded, since the aggregate material adheres satisfactorily to a non-sanded panel and the sanding operation, which is inherently wasteful, is not necessary.

As indicated in Figure 7, a panel 75 having a thickness of $\frac{5}{16}$ of an inch, non-sanded, may be first built up, for instance by the methods disclosed in my patent mentioned above. This panel may be used in place of a conventional $\frac{7}{16}$ inch panel, prior to sanding, thereby effecting a very substantial saving in wood, with a corresponding increase in the production from a given log, since the panel which I employ is $\frac{1}{8}$ of an inch thinner than the corresponding standard panel, prior to sanding.

Instead of removing some of the thickness of the panel during the sanding operation, I increase the thickness by adding a layer 76 of aggregate to one face of the panel, or to both faces, if desired. As shown in Figure 7, the layer 76, after being compacted and bonded to the panel 75 is substantially $\frac{1}{16}$ of an inch thick, thereby building up the panel to the standard, $\frac{3}{8}$ inch thickness.

The thickness of the layer of aggregate applied to the panels or to the metal plates, to produce a covering of this thickness, or of any other desired thickness will depend upon the composition of the aggregate and the degree of pressure applied in the hot press, and will vary between wide limits. For instance, with a satisfactory mixture of ten parts sawdust and one part synthetic resin (solid content, disregarding solvents), a layer of loose, dry aggregate of $\frac{1}{8}$ inch thickness will be reduced to $\frac{1}{16}$, in the hot press under a pressure of substantially 175 pounds per square inch. The temperatures, pressures and compositions of the aggregate may be varied between wide limits, but the results for any one set of conditions will be substantially uniform and any skilled mechanic can readily determine the factors to be employed to produce the desired product.

As pointed out above, it is preferred to build up the plywood panel 75 with the ply 78 thereof having its inner, back, fissured surface 79 disposed outwardly, to provide a surface adapted to made a firm bond with the layer 76 of aggregate. The outer, front, compressed surface 80 is preferably disposed inwardly. The other outer ply 81 may be similarly arranged, but, if desired, the back, fissured surface thereof may be disposed inwardly, in accordance with conventional practice. Of course, if a coating or covering material is to be applied to the exposed face of the ply 81, I prefer to have the fissured, inner, back face disposed outwardly, for reasons pointed out above.

In Figure 6, a further modification of the procedure in accordance with the present invention is diagrammatically illustrated, in accordance with which veneer plies are assembled with a layer or layers of aggregate, to simultaneously build up plywood panels and affix thereto one or two coverings or layers of aggregate. A succession of metal plates 137 are deposited on the conveyor 128 trained over the table 125, with their ends contiguous but spaced a slight distance apart. A layer of aggregate is deposited upon the upper surfaces of the plate by the chute 123, as previously described, the material falling between the ends of the plates being discharged through the openings 135 in the table and collected for re-use. A first smoothing roll 140 and cross-conveyor 155 distribute the aggregate evenly upon the metal plates and remove the excess. Veneer plies of the same width as the plates or of lesser width, in a stack 165 are laid upon the upper surface of the aggregate, with their grain running longitudinally of the conveyor. If plies of the full width of the metal plates are available, they may be deposited with their margins in registry with the plates. Otherwise, a plurality of strips in edge-abutment are laid down, with their ends in registry with the ends of the metal plates and with their side edges coinciding therewith, as closely as is practicable.

Core plies (cross banding veneer sheets or strips) are fed transversely through a conventional glue-coating machine 166, having upper and lower glue-applying rollers, adapted to spread coats of adhesive upon both surfaces of the core plies. Preferably, a heat-setting adhesive, such as a synthetic resin is employed. These plies, with their grain running transversely of the line are laid upon the upper surfaces of the face plies, with their side edges in abutment and arranged to overlap and span by a substantial amount, the ends of the face plies and the metal plates, so that the successive assemblies are interconnected into a chain by the core plies.

Another series of face plies in a stack 165a may be laid upon the chain of assemblies, with their ends in substantial registry with the ends of the metal plates and the first layer of face plies and with the grain running longitudinally of the line. The core plies may be cut by a clipper 167 along the lines between the ends of the metal plates and the face plies, after the upper longitudinally arranged plies have been laid on, or prior thereto, as the case may be. The conveyor 125 is preferably stopped momentarily, under the control of the clipper operator, during the clipping operation. The assemblies so severed from the line are carried forward by another conveyor 128', trained over a continuation 125' of table 125 to a stacker and press loader, or the like, where they may be loaded into a hot press and the veneer plies consolidated into plywood, simultaneously with the bonding of the aggregate thereto. The metal plates may subsequently be stripped from the assemblies, as previously described. If desired, another layer of aggregate may be applied to the upper surfaces of the assemblies, after the top face ply has been applied, either before or after clipping of the core plies, and another metal plate positioned thereon, prior to hot pressing, to produce a double-coated product.

The aggregate used in the various methods of the present invention may be widely varied as to composition and proportions of ingredients. Coloring pigments or dyes may be added, to give the finished product substantially any desired color. The aggregate is an excellent vehicle for fireproofing materials of known types, and if properly incorporated therein will render the resulting product highly resistant to fire. Since fireproofing agents are well-known, they need not be described herein. It has been found that when such agents are included in the aggregate, during the mixing operation, they become a permanent part of the covering and do not tend to leach out when exposed to air and water. Hence, the product retains its fire-resistant characteristics for very substantial periods of time.

The invention is not limited to any particular types of resins or impregnating agents, except that heat setting synthetic resins are preferred. Condensation type resins such as phenol-formaldehyde, urea and furfural are entirely suitable. Also addition type polymers, such as diallyl phthalate and vinyl methacrylate, are advantageous in certain cases.

The invention is also not limited as to size or quality of wood particles employed in the aggregate except that wood flour and paper making fibers are not preferred. The finer grades of sawdust and sanderdust are preferred, such as a mixture of graded sawdust capable of passing through successive screens ranging from four mesh to sixteen mesh. As stated above, the moisture content of the sawdust or other wood particles should be maintained quite low, such as between 2 and 4 per cent by weight.

Although the smoothing devices referred to above are preferred, other types have been found to be satisfactory. Any apparatus which will produce a smooth, even layer of aggregate of uniform thickness may be employed, if the layer can be formed at a reasonably high production rate, such as thirty lineal feet per minute for the conveyor. For instance, a thin, taut, horizontally extending, endless steel belt or band positioned at an accurately controlled distance above the plates or panels on the conveyor and driven at a relatively high speed may be employed to knife-off the excess and convey it to a point of collection for re-use. The band may be mounted in a manner similar to the conveyor 55, but in contact with the material on the plates or panels. The lower surface of the metal band serves to smooth the surface of the aggregate, and the removal of the excess, by knifing and lateral conveying, prevents compacting.

The methods and apparatus of the present invention result in very substantial labor saving, by simplifying the patching and edge-taping procedure and by eliminating the sanding operation. Moreover, they produce an increase in production of 20 to 40 per cent or more from a given supply of logs, and practically eliminate the waste of wood in the manufacture of plywood.

In some cases, particularly when an aggregate having a low resin content is employed, it is advantageous to coat the panel with adhesive, before the aggregate is associated therewith, in order to improve the bond between the panel and the layer.

The invention is not limited to the details of construction described above, nor to the precise procedural steps, but covers all modifications coming within the scope of the appended claims and their equivalents.

I claim:

1. The method of making coated plywood panels which comprises conveying in a line, a succession of metal plates with their ends contiguous but spaced apart, continuously depositing upon the upper surfaces of the plates a layer of a mixture of synthetic resin and wood particles of uniform thickness, depositing upon the surface of the layer a succession of un-consolidated veneer plies with the grain parallel to the line and with their ends contiguous, laying upon the upper surface of said plies, a succession of edge-abutted core plies having both faces glue-coated, having the grain transverse to the direction of movement of the line and arranged to overlap the contiguous ends of the first mentioned veneer plies by a substantial amount, continuously depositing upon the upper surface of the core plies, a succession of veneer plies with the grain running parallel to the line and with their margins in substantial registry with the margins of the first-mentioned plies and the metal plates, severing the core plies on lines between the ends of the metal plates, and subjecting the assemblies so produced to heat and pressure to consolidate the veneer plies into plywood, to compact the mixture and bond the same to the adjacent ply and to convert the resin, and stripping the metal plates from the adjacent layer.

2. The method of making coated plywood panels, which comprises conveying in a line a succession of metal plates with their ends contiguous but spaced apart, continuously depositing upon the upper surfaces of the plates a layer of a mixture of synthetic resin and wood particles of uniform thickness, depositing upon the surface of the layer a plurality of side edge-abutted veneer strips with the grain parallel to the line and with their ends in substantial registry with the ends of the metal plates, laying upon the upper surfaces of said strips, a succession of edge-abutted core plies having both faces glue-coated, having the grain disposed transversely to the direction of the movement of the line, and arranged to overlap the contiguous ends of the first mentioned veneer plies by a substantial amount, continuously depositing upon the upper surface of the core plies, a succession of veneer plies with the grain running parallel to the line and with their margins in substantial registry with the margins of the metal plates, severing the core plies on lines between the ends of the metal plates, and subjecting the assemblies so produced to heat and pressure, to consolidate the veneer plies into plywood, to compact the mixture and bond the same to the adjacent ply and to convert the resin, and stripping the metal plates from the layers.

3. The method of making a coated plywood panel which comprises assembling at least three veneer plies with adhesive to form a plywood panel, with at least one of the face plies being of peeled veneer and having the inside, finely fissured surface thereof, which originally was nearer the heart of the log, disposed outwardly, spreading on the surface of a metal plate a smooth, even layer of a relatively dry mixture of synthetic resin and wood particles, laying said panel upon said layer with said fissured surface in contact therewith, subjecting the assembly so produced to heat and pressure, to bond the layer to the panel and to convert the resin, and stripping the metal plate therefrom.

4. The method of making a coated plywood panel which comprises assembling at least three veneer plies with adhesive to form a plywood panel, with the face plies being of peeled veneer and having the inside, finely fissured surface thereof, which originally was nearer the heart of the log, disposed outwardly, spreading on the surface of a metal plate a smooth, even layer of a relatively dry mixture of synthetic resin and wood particles, laying said panel upon said layer with one of said fissured surfaces in contact therewith, spreading on the upper surface of the panel a smooth, even layer of a relatively dry mixture of synthetic resin and wood particles, laying a metal plate on said layer, subjecting the assembly so produced to heat and pressure to bond the layers to the panel and to convert the resin, and stripping the metal plates therefrom.

5. The method of making a coated plywood panel which comprises assembling at least three veneer plies with adhesive to form a plywood panel, with one of the face plies being of peeled veneer and having the inside, finely fissured surface thereof, which originally was nearer the heart of the log, disposed outwardly, spreading upon said surface a uniform layer of a relatively dry mixture of synthetic resin and wood particles of uniform and substantial thickness, but of less thickness than that of the plywood panel, juxtaposing the layer and the panel below a metal plate, and subjecting the layer and the panel to heat and pressure to bond the layer to said surface of the panel and to convert the resin, and stripping the metal plate therefrom.

6. An apparatus for forming on a moving surface a loose, non-compacted layer of relatively dry pulverant material of accurately controlled thickness and for smoothing the surface thereof, comprising means for delivering to said surface an approximately controlled layer of said material of excess thickness, means spaced an accurate distance above said surface for throwing the excess material upwardly and rearwardly to control the thickness of the remaining layer without compacting the same, and means for catching said excess before it falls upon the oncoming layer and for removing the excess for re-use.

7. An apparatus for depositing upon a series of plates or panels an accurately controlled, loose, non-compacted, smooth layer of a relatively dry mixture of synthetic resin and wood particles, comprising a conveyor for moving a succession of plates or panels along a predetermined path, a chute for delivering a roughly controlled layer of said mixture of excess thickness to their surfaces as they move therebelow, a roll positioned above the conveyor a predetermined, adjustable distance, and having a rough surface in contact with the upper portion of said layer, means for rapidly rotating the roll reversely with respect to the direction of movement of the conveyor, thereby to throw the excess material upwardly and rearwardly and to smooth the surface of the remainder, and means for collecting the rearwardly thrown excess material before it falls upon the oncoming layer, to prevent compacting of the material on the plates or panels.

8. An apparatus for depositing upon a series of plates or panels an accurately controlled, loose, non-compacted, smooth layer of a relatively dry mixture of synthetic resin and wood particles, comprising a conveyor for moving a succession of plates or panels along a predetermined path, a chute for delivering a roughly controlled layer of said mixture of excess thickness to their surfaces as they move therebelow, a roll positioned above the conveyor a predetermined, adjustable distance, and having a rough surface in contact with the upper portion of said layer, means for rapidly rotating the roll reversely with respect to the direction of movement of the conveyor, thereby to throw the excess material upwardly and rearwardly and to smooth the surface of the remainder, and means extending across the conveyor behind the roll for collecting the rearwardly thrown excess material before it falls upon the oncoming layer, to prevent compacting of the material on the plates or panels.

9. An apparatus for depositing upon a series of plates or panels an accurately controlled, loose, noncompacted, smooth layer of a relatively dry mixture of synthetic resin and wood particles, comprising a conveyor for moving a succession of plates or panels along a predetermined path, a chute for delivering a roughly controlled layer of said mixture of excess thickness to their surfaces as they move therebelow, a roll positioned above the conveyor a predetermined, adjustable distance, and having a rough surface in contact with the upper portion of said layer, means for rapidly rotating the roll reversely with respect to the direction of movement of the conveyor, thereby to throw the excess material upwardly and rearwardly and to smooth the surface of the remainder, and a transversely extending conveyor above the succession of plates and behind the roll for collecting the rearwardly thrown excess material before it falls upon the oncoming layer, to prevent compacting of the material on the plates or panels.

10. An apparatus for depositing upon a series of plates or panels an accurately controlled, loose, noncompacted, smooth layer of a relatively dry mixture of synthetic resin and wood particles, comprising a conveyor for moving a succession of plates or panels along a predetermined path, a chute for delivering a roughly controlled layer of said mixture of excess thickness to their surfaces as they move therebelow, an endless belt having one run thereof positioned above the conveyor a predetermined distance and adapted to knife-off the excess material and means for continuously driving the belt to remove the knifed-off material and to prevent its accumulation on the layer, and to smooth the surface of the remainder on the plates or panels.

11. The method of making coated plywood panels, which comprises conveying in a line, a succession of metal plates and plywood panels with certain of them arranged in superposed, registered pairs, depositing on their upper surfaces a smooth uniform layer of a coating material aggregate, superposing the assemblies so produced in a stack with the layers of aggregate interposed between a metal plate of one assembly and a panel of an adjacent assembly, subjecting the plates, panels and aggregate to heat and pressure to bond the aggregate to the adjacent panels, and stripping the plates therefrom.

12. The method of making coated plywood panels which comprises conveying in a line a succession of metal plates and plywood panels arranged in superposed, registered pairs, depositing on the upper surfaces of the pairs a smooth, uniform layer of a coating material aggregate, superposing the assemblies so produced in a stack with the layers of aggregate interposed between a metal plate of one assembly and a panel of an adjacent assembly, subjecting the plates, panels and aggregate to heat and pressure to bond the aggregate to the adjacent panels, and stripping the plates therefrom.

13. The method of making coated plywood panels which comprises conveying in a line a succession of metal plates and plywood panels arranged in superposed, registered pairs, each pair consisting of a plate and a panel, depositing on the upper surfaces of the pairs a smooth, uniform layer of a coating material aggregate, superposing the assemblies so produced in a stack with the layers of aggregate interposed between a metal plate of one assembly and a panel of an adjacent assembly, subjecting the plates, panels and aggregate to heat and pressure to bond the aggregate to the adjacent panels, and stripping the plates therefrom.

14. The method of making coated plywood panels which comprises conveying in a line a succession of metal plates and plywood panels arranged in superposed, registered pairs of plates and panels, alternately, depositing on the upper surface of the pairs a smooth, uniform layer of a coating material aggregate, superposing the assemblies so produced in a stack with the layers of aggregate interposed between a metal plate of one assembly and a panel of an adjacent assembly, subjecting the plates, panels and aggregate to heat and pressure to bond the aggregate to the adjacent panels, and stripping the plates therefrom.

15. The method of making plywood panels having their upper and lower surfaces coated with an aggregate consolidated under heat and pressure which comprises conveying in a line a succession of superposed pairs of metal plates with individual single plywood panels alternating therewith in the line and with the ends of the panels and plates contiguous, depositing on the upper surfaces of the pairs of plates and the panels, a smooth, uniform layer of a coating material aggregate, superposing the assemblies so produced in a stack with the layers of aggregate disposed above and below the plywood panels and with a pair of metal plates between each adjacent pair of panels, subjecting the plates, panels and aggregate to heat and pressure to bond the aggregate to the upper and lower surfaces of the panels, and stripping the plates therefrom.

ARTHUR R. WELCH.

REFERENCES CITED

The following references are of record in the file of this patent:

UNITED STATES PATENTS

| Number | Name | Date |
|---|---|---|
| Re. 22,147 | Howald et al. | July 28, 1942 |
| 734,423 | Liepmann | July 21, 1903 |
| 772,247 | Muller | Oct. 11, 1904 |
| 909,792 | Henderson | Jan. 12, 1909 |
| 1,676,153 | Palmer | July 3, 1928 |
| 1,733,706 | Widin | Oct. 29, 1929 |
| 1,738,966 | Ruttiman, Sr., et al. | Dec. 10, 1929 |
| 1,851,709 | Laucks | Mar. 29, 1932 |
| 1,862,688 | Loetscher | June 14, 1932 |
| 1,875,055 | Loetscher | Aug. 30, 1932 |
| 1,893,430 | McKenzie | Jan. 3, 1933 |
| 1,925,460 | Pegram | Sept. 5, 1933 |
| 1,976,055 | Woodward et al. | Oct. 9, 1934 |
| 1,998,117 | Brush | Apr. 16, 1935 |
| 1,999,509 | Merritt | Apr. 30, 1935 |
| 2,033,411 | Carson | Mar. 10, 1936 |
| 2,078,565 | Durst et al. | Apr. 27, 1937 |
| 2,200,650 | Welch | May 14, 1940 |
| 2,215,244 | Linzell | Sept. 17, 1940 |
| 2,230,880 | Brown | Feb. 4, 1941 |
| 2,246,987 | Roos | June 24, 1941 |
| 2,295,155 | Brown et al. | Sept. 8, 1942 |
| 2,297,504 | Salvaneschi | Sept. 29, 1942 |
| 2,311,588 | Denning | Feb. 16, 1943 |
| 2,317,447 | Domizi | Apr. 27, 1943 |
| 2,323,105 | Welch | June 29, 1943 |
| 2,333,565 | Hawk | Nov. 2, 1943 |
| 2,366,025 | Hall | Dec. 26, 1944 |

FOREIGN PATENTS

| Number | Country | Date |
|---|---|---|
| 485,588 | Great Britain | May 20, 1938 |